METHOD OF MAKING SILICON

Filed April 4, 1966

INVENTORS
Theodore S. Benedict
Albert E. Ozias, Jr.

BY Mueller, Aichele & Rauner

ATTY.

United States Patent Office 3,438,810

Patented Apr. 15, 1969

3,438,810

METHOD OF MAKING SILICON

Theodore S. Benedict, Scottsdale, and Albert E. Ozias, Jr., Tempe, Ariz., assignors to Motorola, Inc., Franklin Park, Ill., a corporation of Illinois Filed Apr. 4, 1966, Ser. No. 540,018
Int. Cl. B44d *1/40*; C01b *33/02*
U.S. Cl. 117—213 12 Claims This invention relates to the manufacture of silicon, and more particularly, to a method of making silicon for semiconductor purposes.

The use of silicon as a semiconductor material in the electronic industry is now widespread. Many methods have been developed for making silicon semiconductor material in commercial quantities. Generally these methods employ a silicon body of high purity as the starting element. Then silicon of equally high purity is grown on this element by deposition from the vapor phase from a decomposable silicon compound. Since the decomposition of the silicon compound takes place at elevated temperatures, the silicon element itself must be heated to these temperatures, usually by electric heating, in order for growth of silicon to occur thereon. However, silicon of high purity exhibits an exceedingly high electric resistance at room temperature. This resistance, fortunately, decreases rapidly with increasing temperature. Thus it has been found to be necessary to provide an auxiliary source of energy which can heat the high resistance silicon body from room temperature to an elevated temperature at which it is sufficiently conductive for normal electric current to maintain the body at the desired deposition temperature.

One such form of additional energy is a very high voltage applied directly through the high purity silicon body to raise its temperature and decrease its resistance. Alternatively, it is known to preheat a silicon body of high resistance by radiation applied external to the body. Such external radiation must be of a magnitude sufficient to increase the temperature of the body to render it conductive to normal electrical current. Still another technique which has found application for this purpose is to heat the silicon body by conduction from a hot, conductive substrate material which in turn is heated electrically. These and other methods are disadvantageous because of the large amount of excess energy which is required merely to heat the silicon body to the deposition temperature.

Accordingly, it is an object of the present invention to provide a method for making silicon in a novel manner.

Another object of the invention is to provide a method for the manufacture of silicon suitable for semiconductor use which is economical and practical.

A more specific object of this invention is to provide a technique for heating silicon of high purity from room temperature to an elevated temperature suitable for deposition of silicon thereon from the vapor phase without the use of the large amounts of energy characteristic of previous methods.

A feature of the present invention is the use of a silicon rod having a conductive layer thereon lengthwise of the rod which is sufficient to render the rod conductive at room temperature at low voltages.

Another feature of the invention is the use of gas etching to remove the conductive layer after the silicon rod has reached an elevated temperature at which such etching can occur.

Still another feature of the invention is the provision of suitable methods for applying the conductive layer to the silicon rod.

Among the other features of the invention is the provision of a silicon body suitable for direct heating from room temperature to the deposition temperature without the use of excessive energy.

These and other objects and features of the invention will be made apparent from the following more particular description of the invention in which reference will be made to the accompanying drawings, in which.

In accordance with the present invention, there is provided herein a method for making silicon suitable for use as a semiconductor in transistors, rectifiers, photocells, and other similar elements, devices and circuits. In general, the method utilizes the known technique of precipitation of silicon from a gaseous silicon compound at a deposition temperature onto a silicon core rod of high purity which is maintained at the deposition temperature.

The present invention is embodied in a method of making semiconductor material which comprises the steps of providing a high purity semiconductor starting element, forming a conductive layer on the element to provide a conductive semiconductor body, electrically heating the body to an elevated temperature, removing the conductive layer from the body and precipitating semiconductor material thereon.

The invention is also embodied in a silicon body comprising a silicon rod having a conductive layer lengthwise of the rod forming a continuous conductive path from one end of the rod to the other. The conductive material in the layer is present in an amount sufficient to render the rod conductive to low applied voltages at room temperature.

An important advantage of the invention is in the fact that it is possible to use small amounts of electrical energy of the order of about $1/100$ of that required by previous methods to heat a silicon rod starting element from room temperature to processing temperatures.

Figure 1:
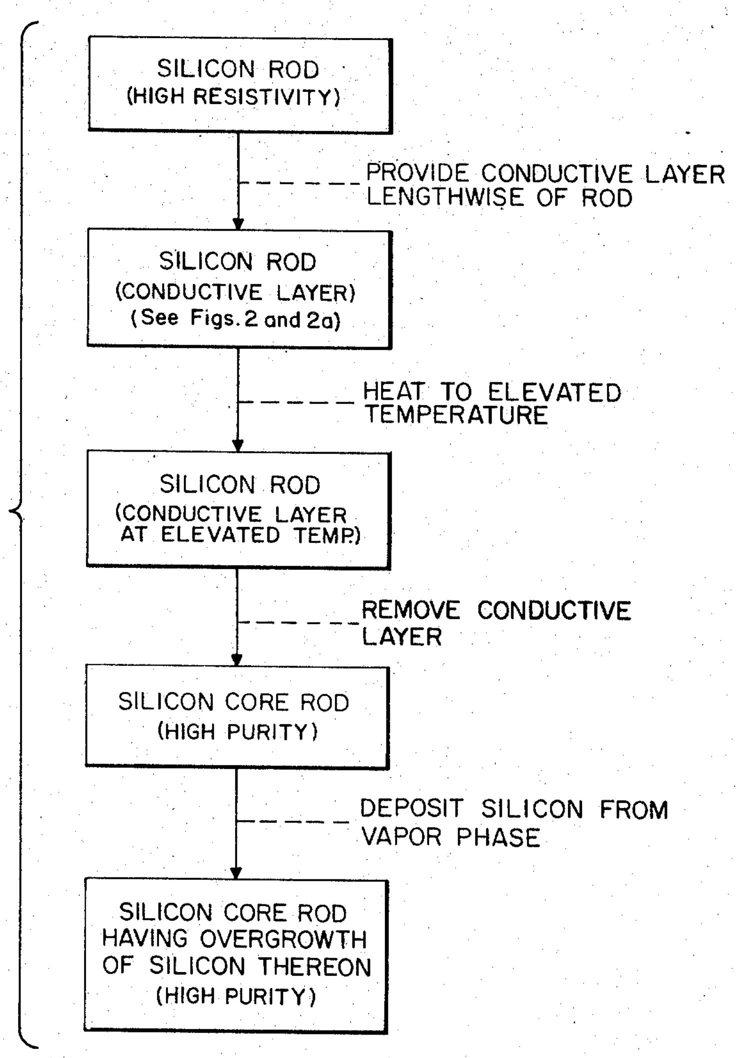
FIG. 1 is a flow sheet to illustrate the process steps employed in the manufacture of silicon according to the process of the present invention.
Figure 2:
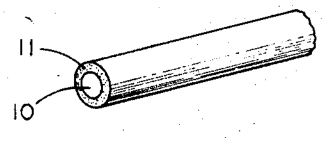
FIG. 2 shows a silicon body at one stage in the process in accordance with the present invention.
Figure 2A:
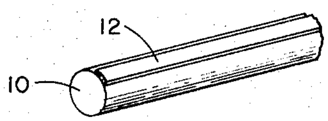
FIG. 2*a* is another embodiment of such a silicon body.

Referring now to the drawings, in FIG. 1 there is shown a flow sheet to illustrate the method steps of the present invention. The accompanying FIGS. 2 and 2*a* are schematic representations of a silicon body at one stage in the process. The process begins with a silicon rod starting element of high purity, which can be made from the same process, or by growth from a melt of silicon. The starting silicon rod has an exceedingly high resistivity, in the order of 100 ohm-cm., and an electric resistance of about 20,000 ohms.

While silicon in the form of a rod is preferably utilized herein as a starting element, it will be understood that any size or shape, including discs, wafers and the like, may be employed as long as the principles of the invention are followed.

The first step in the process is to provide the silicon rod with a layer of conductive material. The amount of such conductive material is sufficient to render the rod conductive at room temperature. Thereby the electrical resistance of the rod is reduced substantially, preferably to a value less than about $1/100$ of the resistance of the original rod. The conductive material advantageously is applied lengthwise of the rod so as to form a substantially continuous conductive path from one end of the rod to the other. Such a silicon rod can provide conduction lengthwise on the rod upon application of current thereto.

Any suitable conductive material may be used as long as it can be removed easily once the rod has been heated to elevated temperatures, as will be described hereinafter. Accordingly, such conductive materials as phosphorus, boron, antimony, arsenic, aluminum, gallium, indium, tin, and the like, preferably are used.

The conductive material may be applied to the rod in any convenient manner. Such techniques as diffusion, spraying and electroless plating have been found to be most useful for this purpose, although other suitable methods which suggest themselves to those skilled in the art also may be used. Diffusion of conductive impurities, such as phosphorus and boron, into the rod has proven particularly advantageous for the formation of the conductive layer. Alternatively, metallic materials may be coated directly onto the rod. Metallic particles of tin, for example, may be sprayed on the rod to provide a conductive stripe lengthwise of the rod. Electroless plating of conductive metals is also useful for this purpose.

FIGS. 2 and 2*a* illustrate the silicon body at the stage in the process where it contains the conductive layer. FIG. 2 shows an embodiment wherein the layer is formed by impurities diffused into the silicon rod. In this illustration, the silicon rod is indicated by reference numeral 10. The region in which the conductive impurities are present in the rod is shown as 11. The impurity region 11 extends lengthwise of the body.

In FIG. 2*a*, the conductive layer 12 is formed on the original rod 10 so that a portion of the diameter of the rod is expanded somewhat. These structures are preferred, although it will be appreciated that a portion of conductive layer 12 may extend into the rod, or completely around it, if desired. Furthermore, the conductive impurity region 11 need not necessarily be present over the entire rod surface.

The silicon rod, including the conductive layer, then is in condition to be electrically heated from room temperature to the deposition temperature. Advantageously, the heating is accomplished by the passage of an electric current though the rod, or the rod may be heated by induction heating, that is, with RF electrical energy. In either case, the electrical conductivity properties of the silicon rod are utilized to achieve the desired heating. In fact, when an electric current is passed through the rod, about the same voltage as employed to hold the rod at the deposition temperature may be used to heat the conductive silicon rod to the deposition temperature. Accordingly, the conductive silicon rod then is heated to an elevated temperature, suitably between about 900° and 1300° C., and preferably between about 1000° and 1200° C. This elevated temperature may be at, above, or below the silicon deposition temperature.

The preferred method of removing the conductive layer is by gas etching. Thus, the elevated temperature should be high enough to enable the etching to proceed at a reasonable rate. Usually the etching temperature is somewhat below the deposition temperature.

The gas etchant employed advantageously comprises a mixture of a halide in an inert gas such as hydrogen. The halide preferably is a hydrogen halide or a semiconductor halide. Suitable hydrogen halides include HCl, HBr and HI with HCl being preferred. Usually a small percentage of HCl in hydrogen at a temperature of about 1000° to 1200° C. is sufficient to remove all the conductive layer in a short time.

The thickness of the conductive layer should be thin enough so that it can be removed easily without substantially reducing the diameter of the silicon rod itself, and thin enough so that gas etching does not take an inordinately long time to complete. A layer thickness in the order of from about 2 to 20 microns is considered a suitable thickness range for the conductive layer, although it will be appreciated that this range is susceptible to wide variation depending upon the particular conductive material used, the etchant, and the temperature.

Once the conductive layer is removed, the silicon rod is in condition to have silicon deposited thereon from the vapor phase. Any suitable apparatus and chemical system may be used for this purpose. A silicon reactor in which one or more silicon rods are mounted in a vessel and heated electrically in the presence of reactant gases is preferred. For example, the general form of apparatus described by Theuerer in the Bell Labs Record, September 1955, pp. 327–330 is suitable for this purpose. Other similar designs have been disclosed in the literature. The reactant system usually consists of a mixture of a silicon compound, preferably a silicon halide, such as silicon tetrachloride or silicochloroform, and hydrogen. These reactant gases are passed over the heated silicon rod to form an overgrowth of silicon thereon.

While the above description has been made with particular reference to silicon as the semiconductor, it will be understood that other semiconductors may be used as well.

The following specific examples will more particularly illustrate the invention.

EXAMPLE I

A silicon rod of high purity with the dimensions: length, 36 inches, and diameter, 7 mm., exhibits a resistivity of 100 ohm-cm., and an electric resistance of 20,000 ohms. The silicon rod is placed in a diffusion furnace set at 1070° C. A source of phosphorus impurities is admitted into the furnace during two hours. At the end of this period, the rod is doped lengthwise to a depth of about 5 microns. The surface concentration of phosphorus atoms exceeds $10^{21}$ P atoms per cc. The resistance of the resultant rod is about 50 ohms. This conductive silicon rod then is heated by passage of electrical current lengthwise of the rod to a temperature of about 1100° C. by the application of about 100 volts of electrical energy. At this point, a mixture containing about 2% HCl in hydrogen is passed over the conductive rod to etch away the conductive layer. Substantially all the conductive layer is removed during an etching period of about 15 minutes. Then a mixture of about 10% silicochloroform in hydrogen is admitted and silicon is deposited on the heated silicon rod.

EXAMPLE II

A conductive stripe of tin is sprayed on a silicon rod having similar dimensions and properties as in the preceding example. The tin stripe extends along the length of the surface of the rod. The thickness of the stripe is about 10 to 20 microns. The procedure of the preceding example then is followed to provide the desired silicon material as before.

A method has been described herein for obtaining silicon for semiconductor use in an improved and novel manner. The method involves a technique for heating high purity, essentially non-conducting silicon from a cold condition to a high temperature where it can conduct as if it were an ordinary metallic substance. The method includes first providing the silicon with a conductive layer which renders the silicon conductive to the application of low voltages. When this voltage is applied, the conductive layer begins to heat up, and it in turn by conduction heats the rest of the silicon body. There has thus been built into the body an in situ source of energy which can be tapped to heat the rest of the body. After the entire body has reached an elevated temperature, the conductive shell is removed, and silicon is deposited in the usual manner.

We claim:

1. A method of making semiconductor material which comprises the steps of:

(a) providing a high purity semiconductor starting element, (b) forming a conductive layer on said element to provide a conductive semiconductor body, (c) electrically heating said body to an elevated temperature, (d) removing said conductive layer from said body, and (e) precipitating semiconductor material thereon.

2. A method according to claim 1 wherein said semiconductor is silicon.

3. A method according to claim 2 wherein said high purity semiconductor starting element is a rod of silicon, and said conductive layer is applied lengthwise of said rod to form a substantially continuous conductive path from one end of said rod to the other.

4. A method according to claim 2 wherein said conductive layer is removed by gas etching, and said conductive body is heated to an elevated temperature sufficient to enable said conductive layer to be removed by said gas etching.

5. A method according to claim 2 wherein said conductive silicon semiconductor body has an electric resistance less than $1/100$ of the electrical resistance of the high purity silicon semiconductor starting element.

6. A method according to claim 2 wherein the conductive layer is formed by diffusion, spraying or electroless plating.

7. A method according to claim 4 wherein said body is electrically heated to a temperature of about 900° to 1300° C. and said conductive layer is removed by etching with a mixture comprising HCl gas and hydrogen gas.

8. A silicon body comprising a silicon rod having a conductive layer lengthwise of the rod forming a substantially continuous conductive path from one end of the rod to the other, the conductive material in said layer being present in an amount sufficient to render said rod conductive to low applied voltages at room temperature.

9. A silicon body according to claim 8 wherein said body has an electric resistance less than $1/100$ of the electric resistance of a silicon rod of high purity having the same dimensions.

10. A silicon body according to claim 8 wherein said conductive layer has a thickness of about 2 to 20 microns.

11. A silicon body according to claim 8 wherein said conductive layer is formed of silicon having conductive impurities diffused therein.

12. A silicon body according to claim 8 wherein said conductive layer is formed of a metal on said rod.

References Cited

UNITED STATES PATENTS

| | | | |
|---|---|---|---|
| 3,240,623 | 3/1966 | Heim | 23—223.5 |
| 3,279,946 | 10/1966 | Schaarschmidt | 117—201 |

WILLIAM L. JARVIS, *Primary Examiner.*

U.S. Cl. X.R.

23—223.5; 117—93, 106, 120